United States Patent

Whitener

[15] 3,645,223
[45] Feb. 29, 1972

[54] HYDROFOIL FLAP CONTROL SYSTEM

[72] Inventor: Philip C. Whitener, Seattle, Wash.

[73] Assignee: The United States of America as represented by the Secretary of the Navy

[22] Filed: Oct. 16, 1970

[21] Appl. No.: 81,301

[52] U.S. Cl. .................................. 114/66.5 H, 114/167
[51] Int. Cl. ........................................... B63b 1/28
[58] Field of Search ........................... 114/66.5 H, 167

[56] References Cited

UNITED STATES PATENTS

| | | | |
|---|---|---|---|
| 2,996,031 | 8/1961 | Easter | 114/167 |
| 3,000,595 | 9/1961 | Dorn | 244/82 |
| 3,055,618 | 9/1962 | Brislawn | 244/87 |
| 3,548,774 | 12/1970 | Pease | 114/162 |

Primary Examiner—Andrew H. Farrell
Attorney—R. S. Sciascia and Q. E. Hodges

[57] ABSTRACT

An actuator is connected to a combined hydrofoil and flap, through a bell crank-lever linkage. A change in the foil angle of attack produces a coincident change in the flap angle. Also the bell crank-lever linkage is connected to the actuator to minimize the effect of the flow stream force on the foil and flap by continuously matching the mechanical advantage of the actuator to the force required to move the flap and foil.

6 Claims, 2 Drawing Figures

PATENTED FEB 29 1972

INVENTOR.
PHILIP C. WHITENER
BY *Hodges*
ATTORNEY

HYDROFOIL FLAP CONTROL SYSTEM

DESCRIPTION OF THE PRIOR ART

The prior art shows articulatable vanes and aerodynamic control surfaces manipulated through lever linkages. But linkages employed in the prior art are simple and are secondary in importance to the functioning of the control surface or vane. These simple linkages provide the minimum of the control connection between the driving force and the control vane without changing the mechanical advantage of the actuator.

SUMMARY

The present invention refers to a hydrofoil flap combination with the flap hinged to the hydrofoil and the hydrofoil rigidly attached to a movable support arm. The flap is additionally linked to an actuator and to the hydrofoil support through a bell crank and lever linkage.

A fully submerged hydrofoil requires a large lift coefficient for take off. This large lift coefficient is obtained by increasing the foil angle of attack and using a relatively large flap angle. In this condition of large foil angle of attack and large flap angle, the center of pressure, or the point through which the resultant of the forces are acting on the foil and flap surfaces due to the hydrostatic pressure, produces a relatively larger moment on the foil and flap than that produced in a normal flying attitude of a smaller foil angle of attack and smaller flap angle. A much larger actuator force is required therefor to change the angle of the hydrofoil and flap when the angle of attack of the foil is larger than when the angle of attack is relatively smaller, as in the case of normal flying attitude.

The purpose of this invention is to link the foil, flap and actuator to increase the actuator mechanical advantage on the foil when the foil and flap angle approaches the maximum, as in takeoff condition, while allowing a sufficient mechanical advantage for the actuator acting on the flap, for a flying attitude angle of attack. Additionally, small movements of the foil produce a coincident change in flap angle thereby producing a larger change in lift coefficient than would otherwise be induced by a foil acting alone.

Accordingly, it is one object of this invention to provide a hydrofoil and flap control system which matches the mechanical advantage of an actuator to the force required to move the flap and foil.

A second object of this invention is the hydrofoil and flap control system wherein the flap is linked to the foil to increase the lift produced by a change of foil angle.

A third object of the invention is a hydrofoil and flap linkage requiring a lighter weight and smaller actuator.

A fourth object of this invention is a hydrofoil and flap combination where the flap is controlled through the foil linkage and no separate flap control is required.

DESCRIPTION OF THE INVENTION

Figure 1:
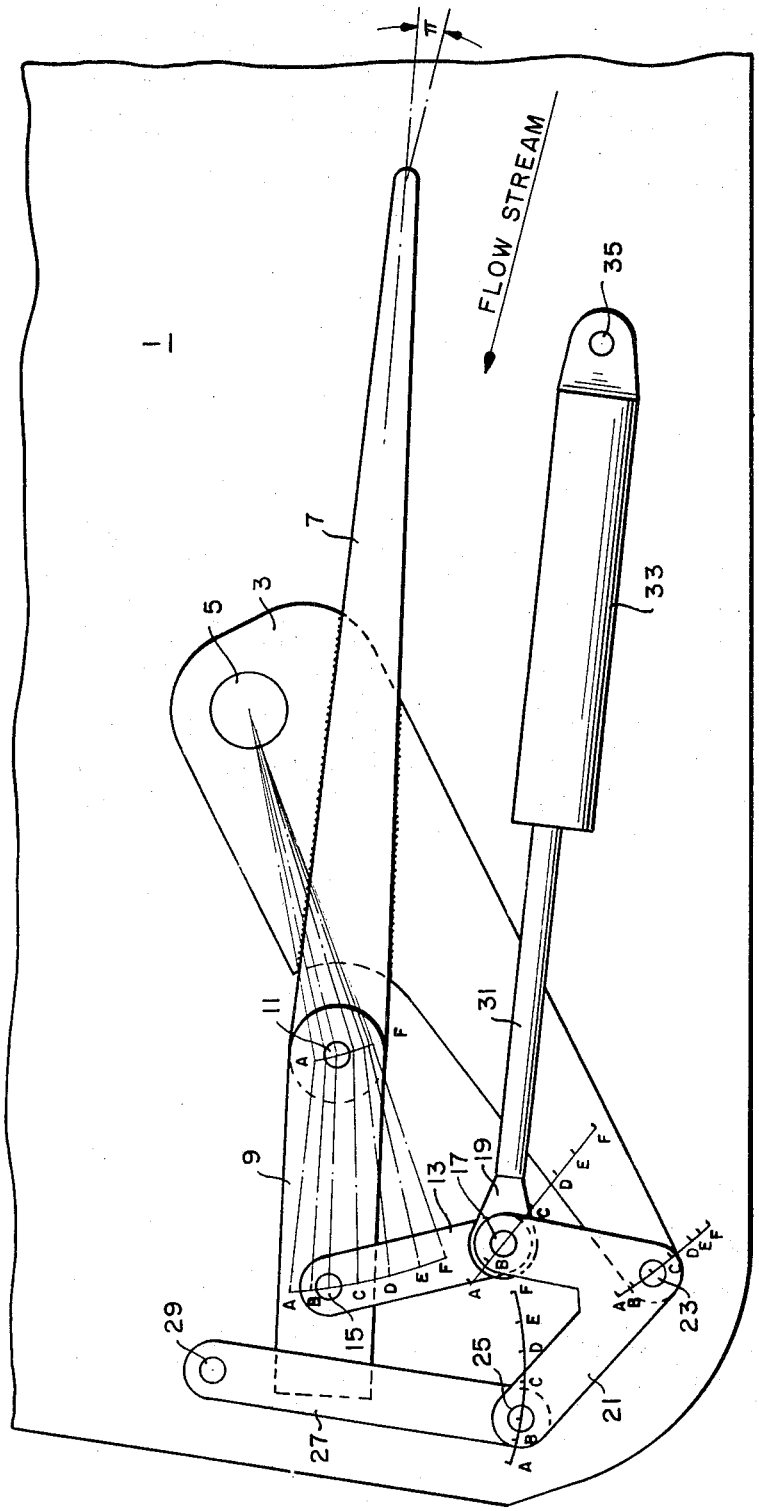
FIG. 1 shows the hydrofoil flap control system with the foil and flap set at an intermediate angle of attack. The foil shown in FIG. 1 is at an angle required to maintain the craft in a flying attitude.

Referring now to the figures, wherein like reference characters designate like or corresponding parts, FIG. 1 shows the hydrofoil flap control system with the flap and foil angle of attack, $\pi$, to the flow stream designed to maintain the vessel in a flying attitude. Rigidly attached to a ship structure 1 is a bearing 5. Attached to bearing 5 and pivoting about the center of bearing 5 is hydrofoil strut 3 with foil 7 attached thereto. Bearing 11 is rigidly attached to foil 7 and pivoting about the axis of bearing 11 is flap 9. A link bar 13 is attached to flap 9 at bearing 15. Bearing 15 is rigidly attached to flap 9 and link bar 13 pivots about bearing 15. Link bar 13, at the end opposite its attachment point to flap 9, is connected to actuator coupling 19 and to bell crank 21 by bearing 17 connecting link bar 13, coupling 19 and bell crank 21, permitting the bell crank 21, the actuator coupling 19, and the link bar 13 to pivot about bearing 17. Bell crank 21 is additionally coupled to hydrofoil strut 3 by bearing 23 allowing the bell crank and the hydrofoil strut to pivot about bearing 23. Bell crank 21 is additionally coupled to support strap 27 by bearing 25 allowing strap 27 and bell crank 21 to pivot about bearing 25. Strap 27 is additionally attached to ship structure 1, at an end opposite its attachment point to bell crank 21, by bearing 29. Bearing 29 is rigidly attached to a structure and allows strut 27 to pivot about bearing 29. Fixed to actuator coupling 19 is actuator arm 31 which is the movable arm portion of hydraulic actuator 33. Hydraulic actuator 33 is attached to ship structure 1 by bearing 35 allowing actuator 33 to pivot about bearing 35.

The set of letters, A–F, each set arranged on an arc passing through the bearings 11, 15, 17, 23 and 25, denote the positions of bearings 11, 15, 23 and 25 corresponding to the positions of bearing 17 and actuator coupling 19.

OPERATION OF THE DEVICE

Figure 2:
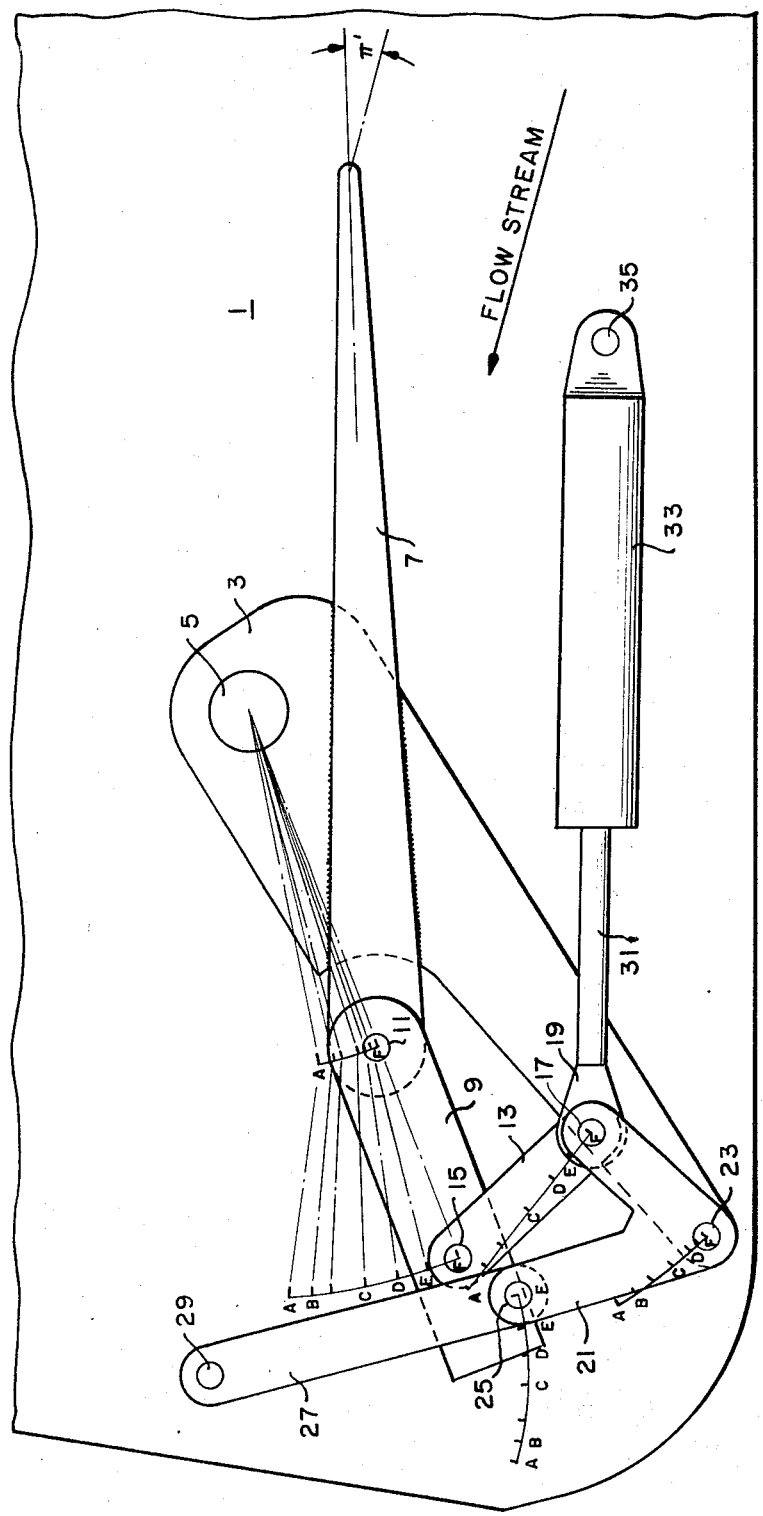
FIG. 2 shows the hydrofoil control system of FIG. 1 with the flap and foil set at an extreme limit of maximum flap and foil angle. This angle of attack is assumed when the craft is starting from a stationary position and is being driven toward a flying attitude.

The angle of the foil and flap to the flow stream is controlled by hydraulic actuator 33. Actuator arm 31, extending coupling 19 and bearing 17 to position A will cause the flap and foil to be at its extreme position of minimum attack angle, $\pi$, to the flow stream. At this angle bearings 11, 15, 23 and 25 will be positioned at A on their respective arcs. At position A, bearings 15, 17 and 23 will be substantially on a straight line resulting in a sufficiently high-mechanical advantage on the flap and the actuator load will be produced almost entirely by the load in strap 27. As actuator arm 31 is contracted, bearings 17 will move through its respective arc from position A through positions B, C, D, E and to its extreme position F, where the angle of attack of the flap and foil to the flow stream will be maximum. As the attack angle is increased, bearing 23 will be moved through its respective arc through positions B, C, D and to F, rotating hydrofoil 7 and increasing its angle of attack to a maximum, $\pi'$ as shown in FIG. 2. Concurrently, with the movement of bearing 17 through its respective arc, actuator 33, acting through coupling 19, bearing 17 and link bar 13, will rotate flap 9 about bearing 11 and increase its angle of attack relative to the flow stream. At the point of maximum flap angle, bearing 15 will be at F on its respective arc. In addition to a rotating movement about bearing 11, flap 9 will undergo a translational movement relative to bearing 5, as bearing 11, coupling flap 9 to foil 7 is moved from A to F on its respective arc. Movement of actuator arm 31 and coupling 19, in addition to changing angle of attack of foil 7 produces a concurrent change in the angle of attack of flap 9. Contraction of actuator arm 31 also produces a rotational movement of bell crank 21 about bearing 23 and a translational movement of bearings 23 and 25 from position A on their respective arcs to F. As bearings 23 and 25 are moved through their respective arcs, the line connecting bearing 23, bearing 25 and bearing 29 will approach a straight line as shown in FIG. 2 and the actuator's mechanical advantage proportional to the linear distance between points 23 and 29 will increase to a maximum, the mechanical advantage on the flap 9 and between points 23 and 15 decreases as the actuator arm 31 is contracted. When the bearings are in position F on their respective arcs, the angle of attack of flap and foil to the flow stream will be a maximum $\pi'$. At this point the mechanical advantage of the actuator on the foil is maximum, matching the large hinge moment necessary to overcome the resultant force of the center of pressure acting on the flap and foil.

An additional benefit from this invention is realized in a sea situation, where small movements of the foil are required to compensate for wave effects. A small movement of the actuator produces a large change in lift coefficient resulting from the combined change of flap and foil angle. Hydraulic power requirements for the flap and foil combination are less than for a foil and flap separately actuated. In the case of this invention, no separate control is required as flap control is effected through the action of the single actuator 33 combining the movement of the foil with the movement of the flap. The single actuator for moving the flapping foil also reduces drag as a need for separate flap actuator is eliminated.

Obviously many modifications and variations of the present invention are possible in the light of the above teachings. It is therefore to be understood that within the scope of the appended claims the invention may be practiced otherwise than as specifically described.

What is claimed is:

1. A control system for changing the angle of attack of a hydrofoil having a flap pivotally mounted to the hydrofoil, comprising:
    a strut pivotally mounted for supporting the hydrofoil and flap;
    an actuator;
    a bell crank pivotally connected to said actuator, to the strut and to the flap for changing the foil and flap angle of attack in response to movement of the actuator;
    a support strap pivotally mounted at one end and pivotally connected to said bell crank at its other end; and
    said actuator having a mechanical advantage for changing the foil angle of attack proportional to the linear distance between the axis of pivoting movement of the bell crank about the strut and the strap mount pivot axis.

2. A control system for changing the angle of attack of a foil and a flap pivotally mounted to the hydrofoil comprising:
    a strut pivotally mounted for supporting the foil;
    an actuator;
    a link bar pivotally connected to said flap at one end and pivotally connected to said actuator at its other end;
    a bell crank pivotally connected to said link and said actuator at a first point and pivotally connected to said strut at a second point;
    a support strap mounted for pivotal movement at one end and connected to a third point on said bell crank, for supporting said bell crank and said strut; and
    said actuator having a mechanical advantage for changing the angle of attack of said foil proportional to the linear distance between said second pivotal point on said bell crank and said support strap mount pivot axis.

3. The system according to claim 2 wherein movement of said actuator in a first direction increases the angle of attack of the foil and increases said linear distance.

4. The system according to claim 3 wherein the angle of attack of said flap is changed coincidentally with the change in the angle of attack of said foil and in the same direction relative to the Flow Stream.

5. The system according to claim 2 wherein said actuator has a mechanical advantage for changing the angle of attack of said flap portional to the linear distance between said second pivotal point on said bellcrank and said link bar pivotal connection point to said flap.

6. A hydrofoil control system comprising:
    a hydrofoil;
    a flap pivotally mounted to said hydrofoil;
    a support strut pivotally mounted and supporting said hydrofoil;
    an actuator;
    a link bar pivotally mounted to said flap at one end and pivotally mounted to said actuator at its other end;
    a bell crank being pivotally mounted to said link bar and said actuator at a first point, and being pivotally mounted to said support strut at a second point;
    a support strap pivotally mounted at one end and pivotally connected to a third point of said bell crank at its other end;
    said first point on said bell crank being intermediate said second point on said bell crank and the axis of pivoting movement of said support strut;
    said actuator having a mechanical advantage for changing the angle of attack of the hydrofoil proportional to the linear distance between said second pivotal point on said bell crank and the strap mount pivot axis; and
    said actuator having a mechanical advantage for changing the angle of attack of said flap proportional to the linear distance between said second pivotal point on said bell crank and said link bar pivotal connection point to said flap.

* * * * *